United States Patent
Streifert et al.

(10) Patent No.: US 10,990,669 B2
(45) Date of Patent: Apr. 27, 2021

(54) VEHICLE INTRUSION DETECTION SYSTEM TRAINING DATA GENERATION

(71) Applicant: BAE Systems Controls Inc., Endicott, NY (US)

(72) Inventors: Kurt A. Streifert, Johnson City, NY (US); John F. Bleichert, Binghamton, NY (US); Michael B. Samsel, Endicott, NY (US)

(73) Assignee: BAE Systems Controls Inc., Endicott, NY (US)

(*) Notice: Subject to any disclaimer, the term of this patent is extended or adjusted under 35 U.S.C. 154(b) by 227 days.

(21) Appl. No.: 16/155,300

(22) Filed: Oct. 9, 2018

(65) Prior Publication Data

US 2020/0110875 A1 Apr. 9, 2020

(51) Int. Cl.
*G06F 21/55* (2013.01)
*H04L 29/06* (2006.01)
*G06K 9/62* (2006.01)

(52) U.S. Cl.
CPC ........ *G06F 21/552* (2013.01); *G06K 9/6256* (2013.01); *H04L 63/1425* (2013.01)

(58) Field of Classification Search
CPC ........................... G06G 21/552; G06F 21/552
See application file for complete search history.

(56) References Cited

U.S. PATENT DOCUMENTS

| | | | |
|---|---|---|---|
| 6,408,391 B1 | 6/2002 | Huff et al. | |
| 7,363,515 B2 | 4/2008 | Frazier et al. | |
| 7,991,583 B2* | 8/2011 | Balzer | B60W 50/045 |
| | | | 702/183 |
| 10,417,614 B2* | 9/2019 | Johnson | G06Q 10/20 |
| 10,728,265 B2* | 7/2020 | Hayden | G06N 3/084 |
| 2012/0284791 A1 | 11/2012 | Miller et al. | |
| 2013/0305357 A1 | 11/2013 | Ayyagari et al. | |

(Continued)

FOREIGN PATENT DOCUMENTS

WO 2016156034 A1 10/2016

OTHER PUBLICATIONS

Song, H.M., et al., "Intrusion Detection System Based on the Analysis of Time Intervals of CAN Messages for In-Vehicle Network", ICOIN 2016, Jan. 13-15, 2016, pp. 63-68.

(Continued)

*Primary Examiner* — Michael A Berns
(74) *Attorney, Agent, or Firm* — Scully Scott Murphy & Presser PC; Scott J. Asmus

(57) ABSTRACT

Methods and systems to generate training data for a model are described. A processor may receive operational data collected by a component of a vehicle. The processor may receive a selection indicating a processing mode to process the operational data. The processor may identify, based on the processing mode, a simulation component configured to simulate the component of the vehicle. The processor may transform the operational data into an instruction for the simulation component. The instruction may be in a format executable by the simulation component to simulate the component of the vehicle. The processor may receive an output of the simulation performed by the simulation component. The processor may train a model using the received output, where the model is being trained to detect abnormal behavior exhibited by the vehicle.

15 Claims, 4 Drawing Sheets

(56) References Cited

U.S. PATENT DOCUMENTS

2014/0250531 A1   9/2014  Moeller et al.
2016/0333855 A1* 11/2016  Lund ..................... F03D 7/045
2019/0379682 A1* 12/2019  Overby .................... H04L 9/14
2019/0379683 A1* 12/2019  Overby ................. G06N 20/00

OTHER PUBLICATIONS

Hayden, P.M., et al., "Cyber Warning Receiver", U.S. Appl. No. 15/624,444, filed Jun. 15, 2017, 47 pages.

* cited by examiner

VEHICLE INTRUSION DETECTION SYSTEM TRAINING DATA GENERATION

FIELD

The present application relates generally to computers, and computer applications, and more particularly to computer-implemented methods and systems relating to cybersecurity in vehicle platforms.

BACKGROUND

A vehicle including components configured to communicate over a network may be vulnerable to cyberattacks. When a component of the vehicle is compromised by a cyberattack, the effects of the cyberattack may spread to other components of the vehicle and also to other vehicles connected to the network. Vehicle network logs, which include vehicle operational data of the vehicle, may provide information for a security system to identify abnormal behavior of the vehicle. However, due to different communication buses and/or protocols used by different vehicles connected to the network and the network itself, the information among the vehicle network logs may provide insufficient training data to train the security system to accurately detect abnormal behavior for all types of vehicles.

SUMMARY

In some examples, a method of generating training data for a model is generally described. The method may include receiving, by the processor, operational data of a vehicle, wherein the operational data is collected by a component of the vehicle. The method may further include receiving, by the processor, a selection indicating a processing mode to process the operational data. The method may further include identifying, by the processor and based on the processing mode, a simulation component configured to simulate the component of the vehicle. The method may further include transforming, by the processor, the operational data into an instruction for the simulation component. The instruction may be in a format executable by the simulation component to simulate the component of the vehicle. The method may further include receiving, by the processor, an output of the simulation performed by the simulation component. The method may further include training, by the processor, a model using the received output, where the model may be trained to detect abnormal behavior exhibited by the vehicle.

In some examples, a system configured to generate training data for a model is generally described. The system may include a memory device and a hardware processor. The memory device may be configured to store operational data collected by a component of a vehicle. The hardware processor may be configured to be in communication with the memory device. The hardware processor may be configured to retrieve the operational data from the memory device. The hardware processor may be further configured to receive a selection indicating a processing mode to process the operational data. The hardware processor may be further configured to identify, based on the processing mode, a simulation component configured to simulate the component of the vehicle. The hardware processor may be further configured to transform the operational data into an instruction for the simulation component. The instruction may be in a format executable by the simulation component to simulate the component of the vehicle. The hardware processor may be further configured to receive an output of the simulation performed by the simulation component. The hardware processor may be further configured to train a model using the received output, where the model may be trained to detect abnormal behavior exhibited by the vehicle.

In some examples, a system configured to generate training data for a model is generally described. The system may include a simulation component, a memory device, and a hardware processor. The simulation environment may include a simulation component. The memory device may be configured to store operational data collected by a component of a vehicle. The hardware processor may be configured to be in communication with the memory device and the simulation environment. The hardware processor may be configured to retrieve the operational data from the memory device. The hardware processor may be further configured to receive a selection indicating a processing mode to process the operational data. The hardware processor may be further configured to identify, based on the processing mode, the simulation component in the simulation environment. The simulation component may be configured to simulate the component of the vehicle. The hardware processor may be further configured to transform the operational data into an instruction for the simulation component. The instruction may be in a format executable by the simulation component to simulate the component of the vehicle. The hardware processor may be further configured to send the instruction to the simulation environment. The simulation component of the simulation environment may be configured to execute the instruction to generate an output. The simulation component of the simulation environment may be further configured to send the output to the hardware processor. The hardware processor may be further configured to train a model using the received output, where the model may be trained to detect abnormal behavior exhibited by the vehicle.

In some examples, a computer program product of training data generation is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In an example, devices and components of a vehicle may utilize communication protocols that do not support security features to communicate with each other. For example, a controller area network (CAN) bus standard may not include encryption standards, which may make the vehicle vulnerable to cyberattacks such as man-in-the-middle packet interception. A system in accordance with the present disclosure (e.g., a system 100 shown in FIG. 1), in some embodiments, provides a solution to the challenge of protecting the vehicle from cyberattacks by producing training data that are generated based on various behaviors of vehicles under all operating modes of the vehicles, where the training data may be used to train a vehicle intrusion detection system (VIDS).

To be further described below, the system 100 may import vehicle network logs into a database, then export data from the database to a script generator to convert the exported data into script file format that can be used in a vehicle simulation environment to stimulate vehicle hardware and drive software emulators. The scripts may be replayed in the simulation environment to generate network traffic that may be used to train an intrusion detection model that may detect cyber attacks against the vehicles. Thus, the intrusion detection model may be trained offline, such as training of the intrusion detection model without physically deploying the intrusion detection model to the computer systems of the vehicles, or without the need to send personnel to a wide range of geographic locations to train the intrusion detection model at different vehicle test events and environmental conditions. The offline training of the intrusion detection model may occur in a simulation environment including software emulators and vehicle hardware that can be stimulated by sensor signals. By training the intrusion detection model in a simulation environment, vehicles may not need to be scheduled for availability to train the intrusion detection model, and the vehicles do not have to be repeatedly operated under particular operating modes or scenarios to train the intrusion detection model as well.

Figure 1:
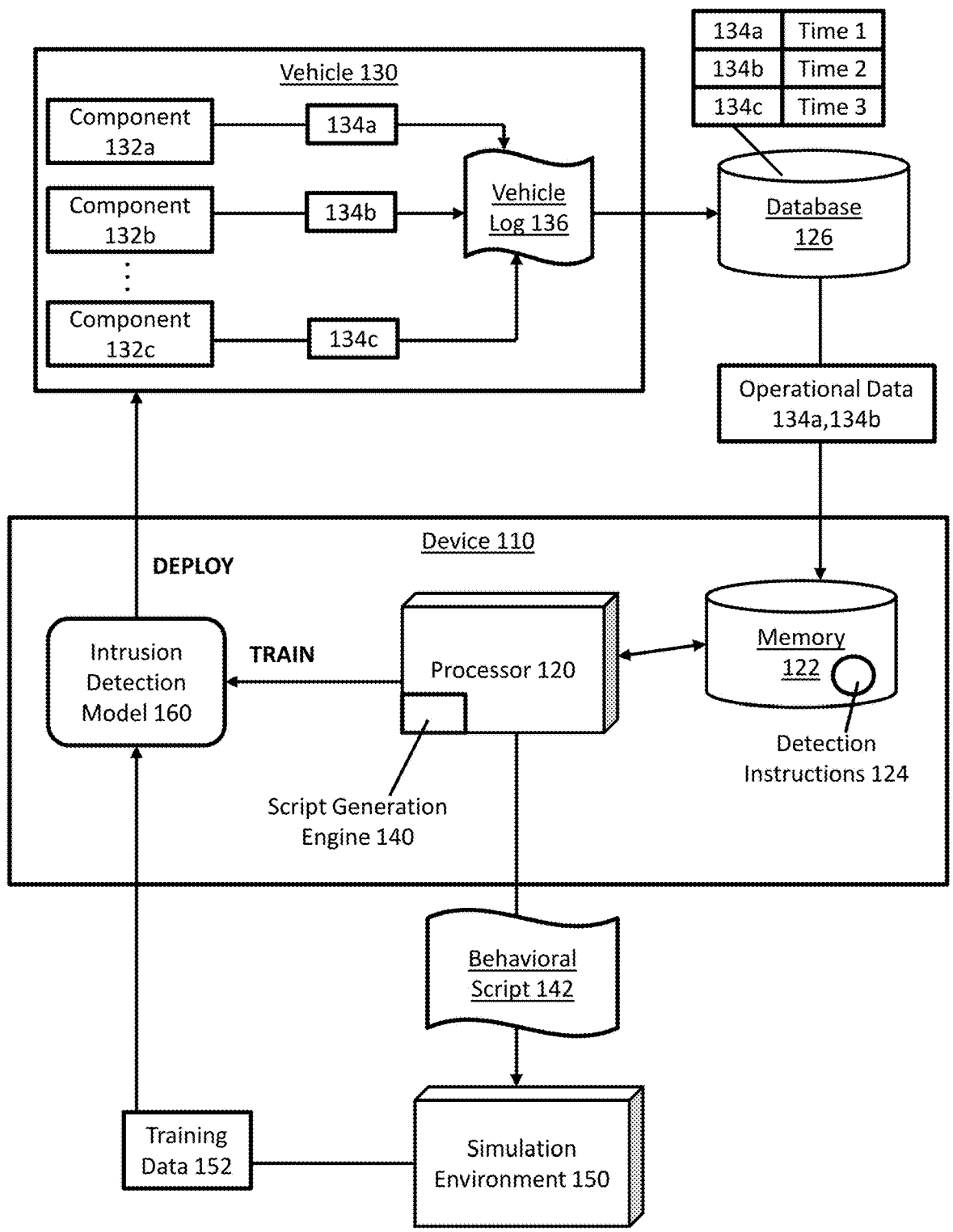
FIG. 1 illustrates an example computer system that can be utilized to implement vehicle intrusion detection system training data generation in one embodiment.

FIG. 1 illustrates an example computer system 100 that can be utilized to implement vehicle intrusion detection system training data generation, arranged in accordance with at least some embodiments described herein. In some examples, the system 100 may include a device 110, one or more vehicles, such as a vehicle 130, a database 126, and/or a simulation environment 150. The device 110, the vehicle 130, and the simulation environment 150 may be configured to be in communication with each other through a network. In some examples, the device 110, the vehicle 130, the database 126, and the simulation environment 150 may be located at the same or different locations. For example, the vehicle 130 may be in operation in a first location, the database 126 may be in a second location, while the device 110 and the simulation environment 150 may be in a third location. In another example, the device 110 and the simulation environment 150 may each be a part of a Vehicle Intrusion Detection System (VIDS). In another example, the database 126 may be in the same location as the device 110 and the simulation environment 150, such that a combination of the device 110, the database 126, and the simulation environment 150 is a part of a VIDS.

The device 110 may be a computer device including a processor 120 and a memory 122 configured to be in communication with each other. In some examples, the processor 120 may be a central processing unit of the device 110, and may be configured to control operations of the memory 122 and/or other components of the device 110. In some examples, the device 110 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure. For example, the processor 120 may be configured to execute a script generation engine 140 to generate one or more behavioral script(s) 142, where the behavioral script 142 may be used by a simulation environment 150 to generate training data 152. The training data 152 may be used by the processor 120 to train an intrusion detection model 160 that may be deployed to the vehicle 130 to predict and/or detect abnormal behaviors exhibited by the vehicle 130.

The memory 122 is configured to selectively store instructions executable by the processor 120. For example, in one embodiment, the memory 122 may store a set of detection instructions 124 ("instructions 124"), where the instructions 124 include instructions, such as executable code, related to machine learning algorithms, script generation, command line applications, and/or other algorithms or techniques, which may implement the system 100. The processor 120 is configured to execute one or more portions of the instructions 124 in order to facilitate implementation of the system 100. In some examples, the instructions 124 may be packaged as a standalone application that may be installed on the computer device implementing the system 100, such that the instructions 124 may be executed by the processor 120 to implement the system 100. In some examples, the instructions 124 may be stored in a programmable hardware component that may be embedded as part of the processor 120.

The vehicle 130 may include one or more components 132 (including 132a, 132b, 132c). Each component 132 may be a hardware component or a software component of the vehicle 130, such as a logical unit, an engine control unit, a transmission control unit, and/or other units of the vehicle 130. Each component 132 may be configured to collect a respective type of operational data 134 (including 134a, 134b, 134c) of the vehicle 130. For example, a hardware component may be a sensor configured to detect analog or digital signals resulting from an operation of the vehicle, while a software component may be a program configured to generate messages to communicate with other components of the vehicle 130. The vehicle 130 may further include a vehicle log 136, which may be stored as a log file or a database in a memory device of the vehicle 130. The vehicle log 136 includes the operational data 134, such as signal values and messages, collected by the components 132 of the vehicle 130, where each piece of operational data 134 stored in the vehicle log 136 may include a timestamp indicating a time in which the piece of data is generated or a time in which the piece of data is stored in the vehicle log 136. In some examples, the components 132 may be configured to generate the timestamps in response to collecting operational data 134. In some examples, a computer of the vehicle 130 may be configured to generate the timestamps in response to collection of the operational data 134 by the components 132, or in response to the operational data 134 being stored in the vehicle log 134.

The components 132 may collect operational data 134 during normal operations of the vehicle 130, including when the vehicle 130 is running under normal operating modes or special modes (e.g., failure mode, test run mode, etc.). Operational data 134 may include data indicating states of various aspects of the operations of the vehicle 130, such as when a vehicle power state is "power-up", "normal", "shutdown", or when an engine operational state is "running", "idle", etc.

The vehicle 130 may store the vehicle log 136 in a database 126, where the database 126 may be a database accessible by the device 110. In an example, other vehicles, in addition to the vehicle 130, may store respective vehicle logs in the database 126. Thus, the database 126 may include operational data or information of one or more vehicles, where the one or more vehicles may be different from each other, and may include different types of vehicles. In some examples, the vehicle 130 may store the vehicle log 136 in the database 126 periodically, where the period may be indicated by the instructions 124 and may be based on a desired implementation of the system 100. In some examples, the period may be defined by a user of the system 100.

The processor 120 may retrieve one or more portions of the vehicle log 136, such as operational data 134a, 134b, from the database 126. In an example, a user of the system 100 or device 110 may request the processor 120 to retrieve a portion of the vehicle log 136 or database 126 on demand. For example, a user of the system 100 may request the processor 120 to retrieve portions of the vehicle log 136 timestamped at "Time 1" and "Time 2". The processor 120 may search for "Time 1" and "Time 2" in the database 126, and upon finding "Time 1" and "Time 2", retrieve operational data 134a, 134b corresponding to the requested times.

By allowing the user to select operational data collected at particular times, the system 100 may generate training data 152 that corresponds to particular operating modes. For example, if "Time 1" and "Time 2" are times in which the vehicle 130 was operating under normal conditions, then user may select "Time 1" and "Time 2" in order for the processor 120 to retrieve operational data 134a, 134b that corresponds to operational data collected at the vehicle 130 under normal operating mode. If the user wishes to train the intrusion detection model 160 to detect behaviors of the vehicle 130 during a test run mode, the user may select a time in which the vehicle 130 was operating under the test run mode such that the processor 120 may retrieve operational data that corresponds to a time of test run mode, and generate training data 152 that is associated with operations of the vehicle 130 during test run modes.

In another example, the database 126 may be partitioned into different portions, where each portion may include operational data of a respective type or model of vehicle. The user may request operational data of one or more types of vehicles (or vehicle model numbers), such that the processor 120 may retrieve the operational data from the database 126 that corresponds to requested vehicles.

The processor 120 may apply the retrieved operational data 134a, 134b to the script generation engine 140 in order to generate the behavioral script 142. Generation of the behavioral script 142 will be further described below. The behavioral script 142 may be a script file including one or more command line instructions that may be executed by command line applications. The processor 120 may send the behavioral script 142 to the simulation environment 150. The simulation environment 150 may be a simulation system, lab, or environment including hardware and software components configured to simulate components of one or more vehicles. For example, the simulation environment 150 may include hardware simulation components that may replicate the hardware components among components 132, and the simulation environment 150 may include computer devices that are configured to run software programs to simulate software components among the components 132. In an example, the hardware components of the simulation environment 150 may include sensors of different resistance and voltages that may be stimulated by signals and to generate output signals. In an example, the software components of the simulation environment 150 may include computer programs that may simulate programs that may be run by a system of the vehicle 130 to generate communication messages and packets that may be communicated between components 132. In some examples, the simulation environment 150 may include a command line application configured to execute the behavioral script 142. In another example, if the user of system 100 requests operational data of five different vehicles, such as five vehicles of the same model but different serial number, the script generation engine 140 may generate five pieces of behavioral script 142, one for each requested vehicle.

The simulation environment 150 may simulate one or more behaviors of the vehicle 130 by executing the behavioral script 142, where the outputs of each simulation component among the simulation environment 150 may be added to training data 152 that may be used to train the intrusion detection model 160. For example, outputs from a sensor (that replicates a sensor of the vehicle 130) in the simulation environment 150 may be added, such as by the processor 120, to the training data 152. In another example, network communication messages generated by a software simulation component in the simulation environment 150 may also be added, such as by the processor 120, to the training data 152. The training data 152 may be used by the processor 120 to train the intrusion detection model 160 to predict and/or detect any abnormal behavior exhibited by the vehicle 130. As a result of the training, the intrusion detection model 160 may classify particular sensor outputs or network communication messages into different operating modes of the vehicle 130. The classification allows the intrusion detection model 160 to predict and/or detect any suspicious behavior that may be exhibited by the vehicle 130, and may notify a system of the vehicle 130 to generate alerts for security systems or personnel to indicate a potential cyberattack.

By training the intrusion detection model 160 with training data 152 that corresponds to one or more different operating modes, the intrusion detection model 160, when deployed in the vehicle 130, may predict and/or detect any abnormal behavior, and also distinguish normal behavior from abnormal behavior, that may be exhibited by the vehicle 130. For example, a message X is a message communicated between two components of the vehicle 130 during a cold start condition. If the intrusion detection model 160, when deployed in the vehicle 130, detects a presence of message X and also detects a relatively high temperature, then there is a possibility that the presence of the message X is a result of a cyberattack on the vehicle 130.

In an example, the instruction detection model 160 is trained to model observable interactions among the components 132 of the vehicle 130, such as modeling various impulses and responses, and communication bus traffic among the components 132 of the vehicle 130. In some embodiments, the training data 152 are outputs from the simulation environment 150 that is configured to simulate all operating modes of the vehicle 130. Therefore, by training the intrusion detection model 160 using the training data 152, the intrusion detection model 160 may be trained with a dataset that covers all operating modes of the vehicle 130. Thus, the intrusion detection model 160 may model the interactions among the components 132, and may classify normal and abnormal behaviors that may be exhibited by the components 132 of the vehicle 130.

Figure 2:
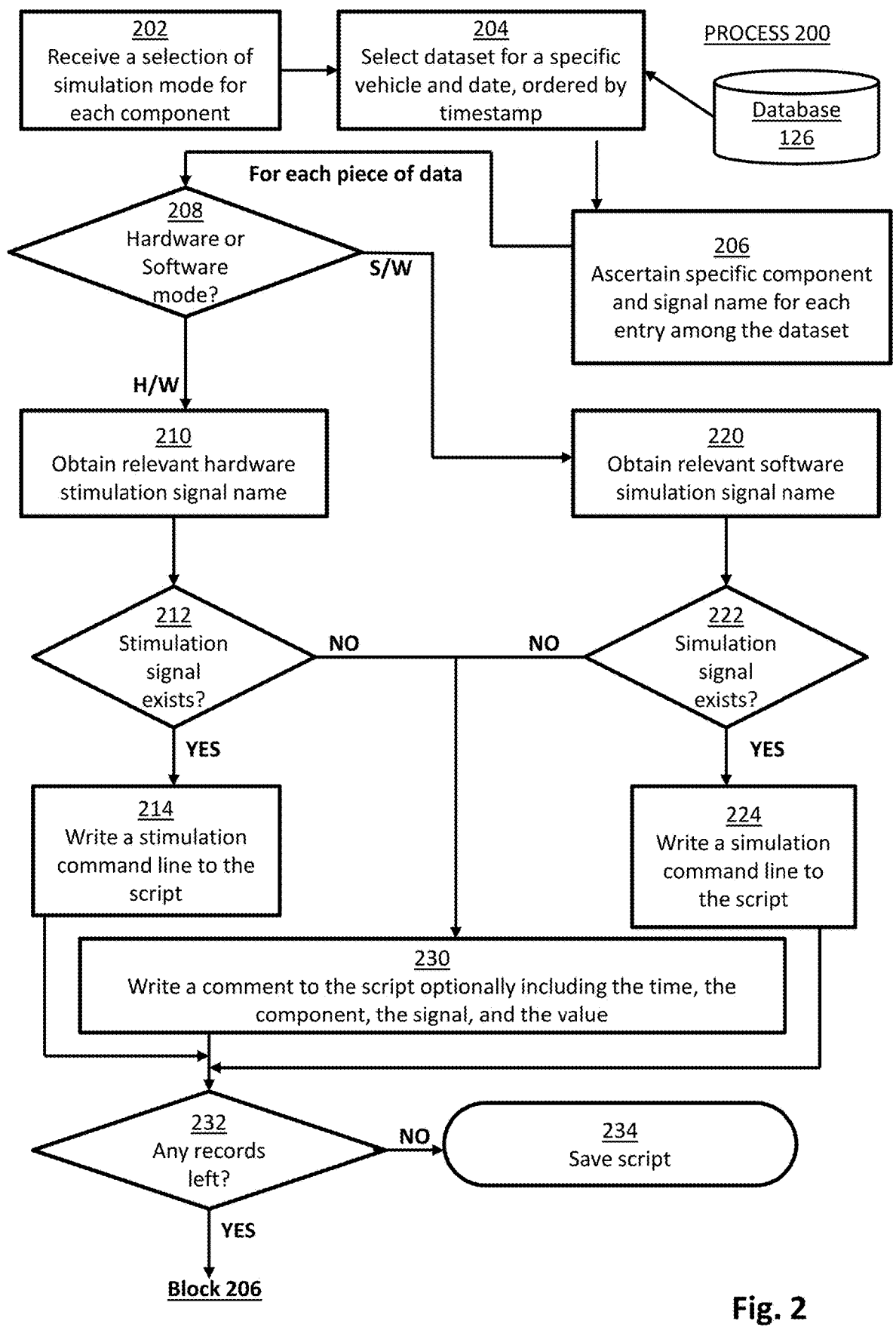
FIG. 2 illustrates a flow diagram relating to a process to generate a behavioral script during the implementation of the example system of FIG. 1, in one embodiment.

FIG. 2 illustrates a flow diagram relating to a process to generate a behavioral script during the implementation of the system 100, arranged in accordance with at least some embodiments presented herein. FIG. 2 may be described below with reference to the above description of FIG. 1. The process shown in FIG. 2 may include one or more operations, actions, or functions as illustrated by one or more of blocks 202, 204, 206, 208, 210, 212, 214, 220, 222, 224, 230, 232, and 234. Although illustrated as discrete blocks, various blocks may be divided into additional blocks, combined into fewer blocks, eliminated, or performed in parallel, depending on the desired implementation.

The processor 120 may execute the script generation engine 140 to generate the behavioral script 142. A process 200 to generate the behavioral script 142 may begin at block 202, where the processor 120 may receive a selection of simulation mode for each component 132. For example, the user of the system 100 may select hardware simulation mode for hardware components that may be stimulated by signals, such as sensors, and may select software simulation mode for software components that may not be stimulated by signals, such as computer programs. In some examples, the selections of hardware or software mode made by the users may be based on availability of components of the simulation environment 150. For example, if the simulation environment 150 includes a vehicle speed sensor identical to a vehicle speed sensor of the vehicle 130, the user may select hardware mode for the component corresponding to the vehicle speed sensor. If the simulation environment 150 does not include the vehicle speed sensor, the user may select software mode such that a computer of the simulation environment 150 may run programs to emulate the vehicle speed sensor.

The process 200 may continue from block 202 to block 204, where the processor 120 may select particular data for specific vehicle(s), date(s), and order the selected data by corresponding timestamp. For example, the user of the system 100 may request to train the intrusion detection model 160 using data corresponding to the vehicle 130 at "Time 1" and "Time 2". The processor 120 may select and retrieve the operation data 134a, 134b from the database 126 based on the request by the user. In an example, a format of the operational data 134 stored in the database 126 may be (Time, Subsystem, Field, Value), where "Time" refers to the timestamp of the operational data, "Subsystem" is an identifier of a component, "Field" specifies a signal name of the operational data, and "Value" is the value of the operational data. For example, operational data 134a collected by component 132a may be (14:29:32.653, LU1, VEHICLE_SPEED, 0.0), which indicate that at a time 14:29:32.653 ("Time 1"), the operational data 134a collected by a vehicle speed sensor component LU1 (132a) indicates that a vehicle speed is 0.0. In another example, the operational data 134b may be (14:29:44.390, LU2, RUNTIME_PUMP_PRESS, 90), which indicates that at a time 14:29:44.390 ("Time 2"), the operational data 134b collected by a fuel pump component LU2 (132b) indicates that a pressure of a fuel pump is 90 psi. Upon selecting the operational data 134a, 134b, the processor 120 may order the selected data based on the timestamp, such that operational data 134a is ordered prior to the operational data 134b.

The process 200 may continue from block 204 to block 206, where the processor 120 may ascertain each piece of operational data 134 to specific component and signal name. For example, the processor 120 may ascertain, or associate, component 132a and the signal name VEHICLE_SPEED (indicated by operational data 134a) to operational data 134a, and may ascertain, or associate, component 132b and the signal name RUNTIME_PUMP_PRESS (indicated by operational data 134b) to operational data 134b.

For each piece of operational data, the process 200 may continue from block 206 to block 208. Using operational data 134a as an example, at block 208, the processor 120 may determine whether the operational data 134a should be processed based on hardware mode or software mode. The processor 120, based on the selection obtained in block 202, may determine that the user of the system 100 selected hardware mode for operational data collected by vehicle speed sensors. The processor, based on the associations resulting from block 206, may determine that operational data 134a is associated with a vehicle speed signal collected by a vehicle speed sensor (132a). Thus, the process 200 may continue from block 208 to block 210.

At block 210, the processor 120 may obtain a stimulation signal name from a database of the simulation environment 150, where the obtained stimulation signal name may be relevant to the signal name VEHICLE_SPEED of the operational data 134a. For example, even though the simulation environment 150 may include sensors to emulate vehicle speed sensors of the vehicle 130, each sensor among the simulation environment 150 may output signals of different names, such as SPEED, ODOMETER_READING, VEHICLE_SPEED, and/or other signal names to represent speed of a vehicle. In such a situation, the processor 120 may perform a database lookup in the database of the simulation environment 150 to identify a signal name that may be identical, or similar, to the signal name VEHICLE_SPEED indicated by the operational data 134a.

The process 200 may continue from block 210 to block 212, where the processor 120, based on the result of block 210, may determine whether a stimulation signal name identified in block 210 exists. For example, if the block 210 returns an empty result, the processor 120 may determine an absence of a stimulation signal name relevant to the operational data 134a. If the block 210 returns a result, then the processor 120 may determine a presence of a stimulation signal name relevant to the operational data 134a.

In response to a presence of a stimulation signal name, the process 200 may continue from block 212 to block 214, where the processor 120 may generate a stimulation command line to the behavioral script 142. The stimulation command line may be an instruction including a string of text, and may be inputted into a simulation component of the simulation environment 150. The stimulation command line may be of a format that can be interpreted by the simulation component of simulation environment 150 in order for the simulation component to simulate component 132a. In an example, the processor 120 may generate the stimulation command line in a format that can be interpreted and executed by a simulation component associated with the identified signal name from block 210. For example, the signal name VEHICLE_SPEED may be a signal name for outputs generated by a simulation component K in the simulation environment 150, where the simulation component K may be a vehicle speed sensor substantially similar to component 132a. For example, the stimulation command line generated by the processor 120 for the operational data 134a may be "sensor, VEHICLESPEEDSENSOR, slide, True, 0.0, False", where the format of the generated stimulation command line may be recognized and interpreted by the simulation component K as an instruction to simulate a vehicle speed sensor detecting a specified speed (in this example, 0.0). In some examples, the processor 120 input a timestamp of the operational data 134*a* along with the stimulation command line into the simulation component K, such that an output of the simulation component K preserves the timestamp of the operational data 134*a*. In some examples, the processor 120 may also generate a comment to accompany the stimulation command line, such as "# (Stim) LU1→VEHICLE_SPEED" to describe the stimulation command line.

In response to a presence of a stimulation signal name, the process 200 may continue from block 212 to block 214, where the processor 120 may generate a stimulation command line to the behavioral script 142. The stimulation command line may be an instruction including a string of text, and may be inputted into a simulation component of the simulation environment 150. The stimulation command line may be of a format that can be interpreted by the simulation component of simulation environment 150 in order for the simulation component to simulate component 132*a*. In an example, the processor 120 may generate the stimulation command line in a format that can be interpreted and executed by a simulation component associated with the identified signal name from block 210. For example, the signal name VEHICLE_SPEED may be a signal name for outputs generated by a simulation component K in the simulation environment 150, where the simulation component K may be a vehicle speed sensor substantially similar to component 132*a*. For example, the stimulation command line generated by the processor 120 for the operational data 134*a* may be "sensor, VEHICLESPEEDSENSOR, slide, True, 0.0, False", where the format of the generated stimulation command line may be recognized and interpreted by the simulation component K as an instruction to simulate a vehicle speed sensor detecting a specified speed (in this example, 0.0). In some examples, the processor 120 inputs a timestamp of the operational data 134*a* along with the stimulation command line into the simulation component K, such that an output of the simulation component K preserves the timestamp of the operational data 134*a*. In some examples, the processor 120 may also generate a comment to accompany the stimulation command line, such as "# (Stim) LU1→VEHICLE_SPEED" to describe the stimulation command line.

In response to an absence of a stimulation signal name, the process 200 may continue from block 212 to block 230, where the processor 120 may generate a comment (or a no operation, "no-op", instruction), instead of a command line, to the behavioral script 142. For example, the processor 120 may generate a comment indicating the absence of the stimulation signal name, or generate a comment including the original operational data 134*a*.

The process 200 may continue from block 214, or block 230, to block 232. In the example, the processing of the operational data 134*a* may conclude at block 214 (generation of a command line) or at block 230 (generation of a comment). At block 232, the processor 120 may determine if there are any remaining operational data that are not yet processed, such as the operational data 134*b*. In response to determining a presence of unprocessed operational data, the process 200 may return to block 206 to process a next operational data (e.g., 134*b*).

At block 206, the processor 120 may identify a next piece of operational data among data ascertained in block 206, which in this example, is operational data 134*b*. Continuing the process 200 from block 206 to block 208, at block 208, the processor 120 may determine whether the operational data 134*b* should be processed based on hardware mode or software mode. The processor 120, based on the selection obtained in block 202, may determine that the user of the system 100 selected software mode for operational data collected by fuel pumps. The processor, based on the associations resulting from block 206, may determine that operational data 134*b* is associated with a fuel pump pressure exerted by a fuel pump. Thus, the process 200 may continue from block 208 to block 220. In an example, even though a fuel pump is a hardware component among the components 132, the user may select using software mode to process operational data associated with fuel pumps if a replica of the fuel pump, and/or corresponding equipment required to simulate exertion of the pressure, are not available in the simulation environment 150.

At block 220, the processor 120 may obtain a simulation signal name from the database of the simulation environment 150, where the obtained stimulation signal name may be relevant to the signal name RUNTIME_PUMP_PRESS of the operational data 134*b*. The processor 120 may perform a database lookup in the database of the simulation environment 150 to identify a signal name that may be identical, or similar, to the signal name RUNTIME_PUMP_PRESS indicated by the operational data 134*b*.

The process 200 may continue from block 220 to block 222, where the processor 120, based on the result of block 220, may determine whether a simulation signal name identified in block 220 exists. For example, if the block 210 returns an empty result, the processor 120 may determine an absence of a simulation signal name relevant to the operational data 134*b*. If the block 220 returns a result, then the processor 120 may determine a presence of a simulation signal name relevant to the operational data 134*b*.

In response to a presence of a simulation signal name, the process 200 may continue from block 222 to block 224, where the processor 120 may generate a simulation command line to the behavioral script 142. The simulation command line may be an instruction including a string of text, and may be inputted into a simulation component of the simulation environment 150. The simulation command line may be of a format that can be interpreted by the simulation component of simulation environment 150 in order for the simulation component to simulate component 132*b*. In an example, the processor 120 may generate the simulation command line in a format that can be interpreted and executed by a simulation component associated with the identified signal name from block 220. For example, the signal name RUNTIME_PUMP_PRESS may be a signal name for outputs generated by a simulation component M in the simulation environment 150, where the simulation component M may be a computer program configured to simulate the component 132*b*. For example, the simulation command line generated by the processor 120 for the operational data 134*b* may be "setvar, LU2, PumpOutPress, 90.0", where the format of the generated simulation command line may be recognized and interpreted by the simulation component M as an instruction to simulate a fuel pump reading of "90 psi". In some examples, the processor 120 inputs a timestamp of the operational data 134*b* along with the stimulation command line into the simulation component M, such that an output of the simulation component M preserves the timestamp of the operational data 134*b*. The processor 120 may also generate a comment to accompany the simulation command line, such as "# (Sim) LU2→RUNTIME_PUMP_PRESS" to describe the simulation command line. In some examples, the format of the stimulation command line under the hardware mode and the format of the simulation command line under the software mode may be different formats. The process 200 may continue from the block 222 to block 224, where the processor 120 may write the simulation command line to the behavioral script 142.

In response to an absence of a simulation signal name determined at block 222, the process 200 may continue from block 222 to block 230, where the processor 120 may generate a comment (or a no operation, "no-op", instruction), instead of a command line, to the behavioral script 142. For example, the processor 120 may generate a comment indicating the absence of the simulation signal name, or generate a comment including the original operational data 134b.

The process 200 may continue from block 224, or block 230, to block 232. In the example, the processing of the operational data 134b may conclude at block 224 (generation of a command line) or at block 230 (generation of a comment). At block 232, the processor 120 may determine if there are any remaining operational data that are not yet processed. In response to determining that there are no operational data remaining for further processing, the process 200 may continue from block 232 to block 234, where the processor 120 may save the behavioral script 142 in the memory 122.

Figure 3:
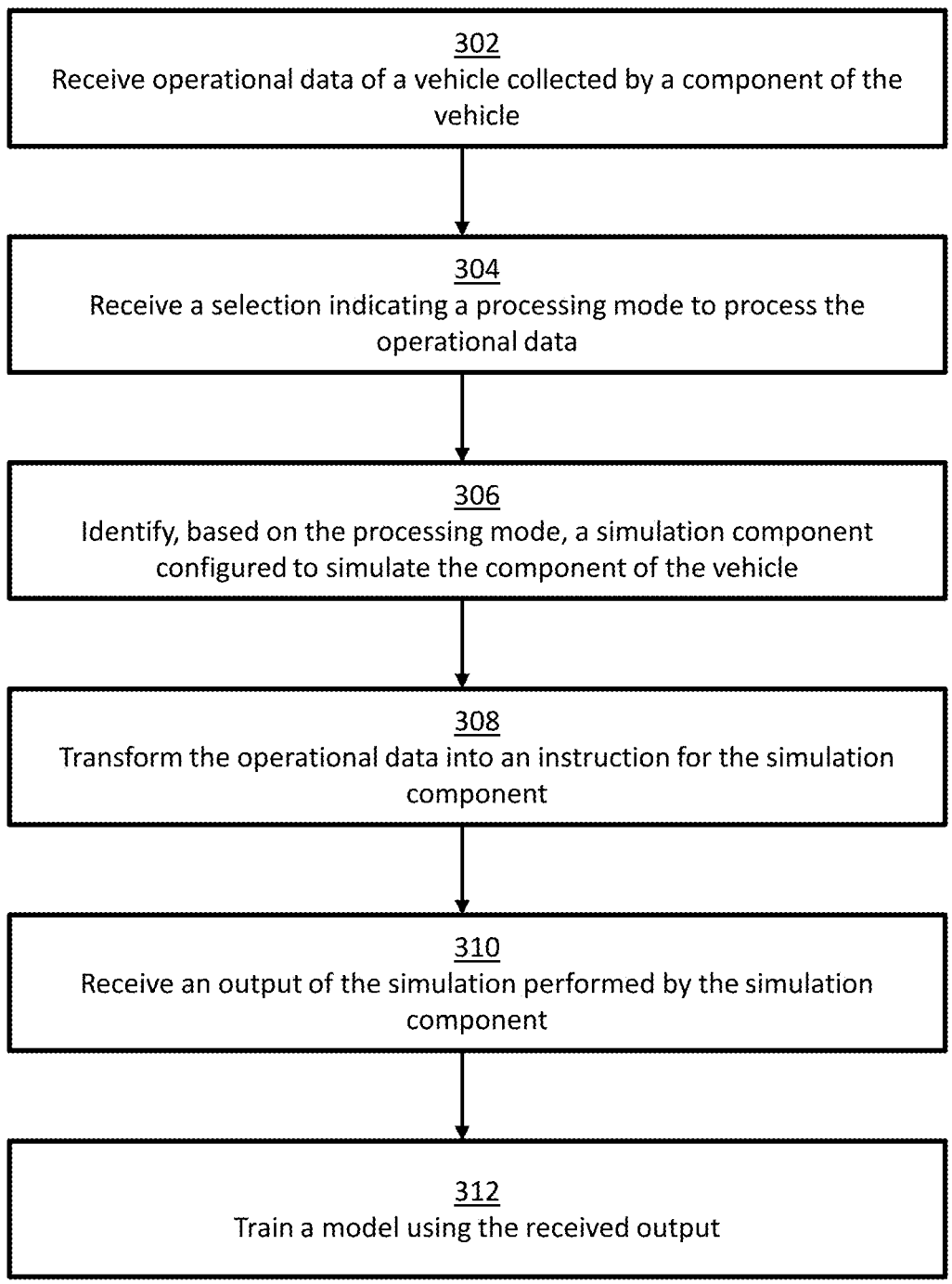
FIG. 3 illustrates a flow diagram relating to vehicle intrusion detection system training data generation in one embodiment.

FIG. 3 illustrates a flow diagram relating to vehicle intrusion detection system training data generation in one embodiment, arranged in accordance with at least some embodiments presented herein. The process in FIG. 3 may be implemented using, for example, computer system 100 discussed above. An example process may include one or more operations, actions, or functions as illustrated by one or more of blocks 302, 304, 306, 308, 310, and/or 312. Although illustrated as discrete blocks, various blocks may be divided into additional blocks, combined into fewer blocks, eliminated, or performed in parallel, depending on the desired implementation.

Processing may begin at block 302, where a processor receives operational data of a vehicle collected by a component of the vehicle. In some examples, the processor may receive the operational data by retrieving the operational data from a database configured to store a plurality of operation data collected by a plurality of components of the vehicle.

Processing may continue from block 302 to block 304. At block 304, the processor receives a selection indicating a processing mode to process the operational data. The selection may be received from a user device being operated by a user of the system 100.

Processing may continue from block 304 to block 306. At block 306, the processor identifies, based on the processing mode, a simulation component configured to simulate the component of the vehicle. In some examples, when the processing mode is a hardware processing mode, the simulation component is a replica of the component. In some examples, when the processing mode is a software processing mode, the simulation component is a computer program configured to simulate operations of the component.

Processing may continue from block 306 to block 308. At block 308, the processor transforms the operational data into an instruction for the simulation component. The instruction is in a format executable by the simulation component to simulate the component of the vehicle. In some examples, the instruction is a command line instruction, and the simulation component is associated with a command line application.

Processing may continue from block 308 to block 310. At block 310, the processor receives an output of the simulation performed by the simulation component. The output may reflect operational behavior of the vehicle under different times and/or scenarios.

Processing may continue from block 310 to block 312. At block 312, the processor trains a model using the received output. The model is being trained to detect abnormal behavior exhibited by the vehicle. The processor may further deploy the trained model to the vehicle.

Figure 4:
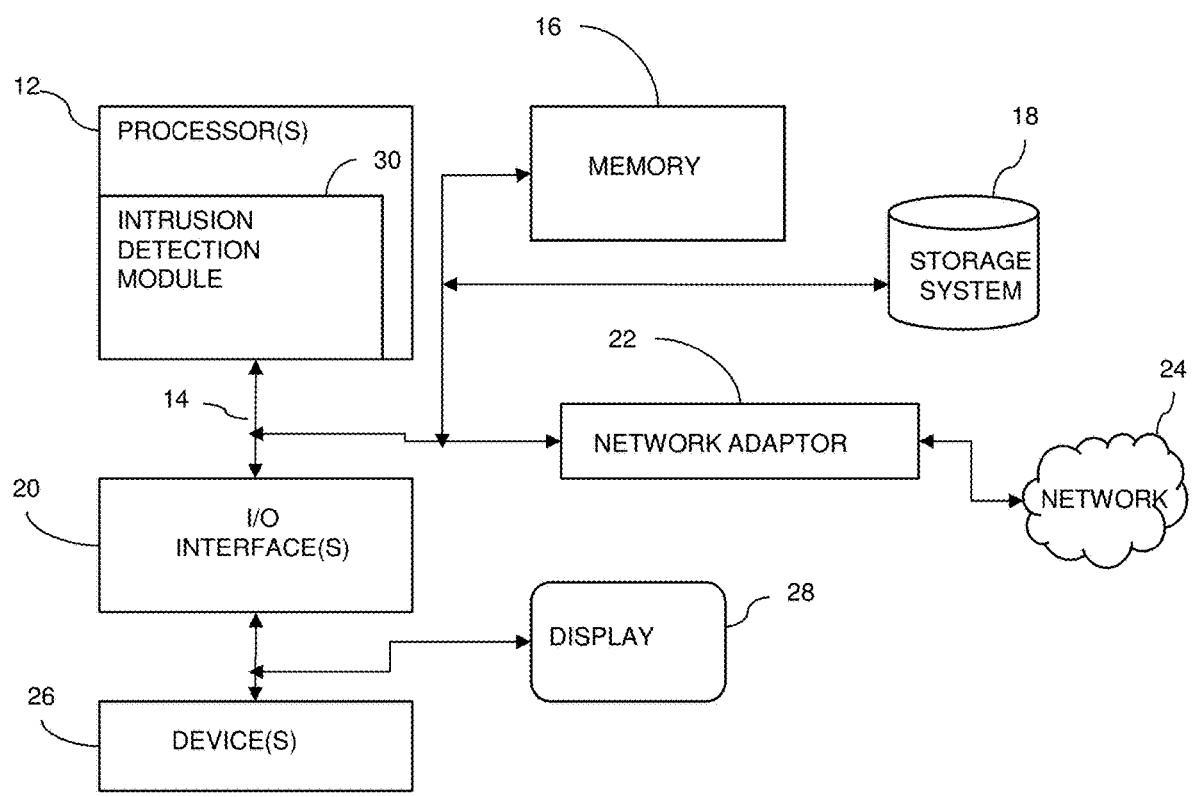
FIG. 4 illustrates a schematic of an example computer or processing system that may implement vehicle intrusion detection system training data generation in one embodiment.

FIG. 4 illustrates a schematic of an example computer or processing system that may implement vehicle intrusion detection system training data generation in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., intrusion detection module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer-readable storage medium storing a computer program, the computer program being arranged such that, when executed by one or more processors, cause the one or more processors to:
receive, by the one or more processors, operational data of a vehicle, wherein the operational data is collected by a component of the vehicle;
receive, by the one or more processors, a selection indicating a processing mode to process the operational data;
identify, by the one or more processors and based on the processing mode, a simulation component configured to simulate the component of the vehicle;
transform, by the one or more processors, the operational data into an instruction for the simulation component, wherein the instruction is in a format executable by the simulation component to simulate the component of the vehicle, wherein transforming the operational data into the instruction comprises:
searching, by the one or more processors, a database for a signal name relevant to a field within the operational data;
in response to a presence of the signal name in the database, generating a command line instruction using the signal name; and
in response to an absence of the signal name in the database, generating the command line instruction as a no-operation instruction;
receive, by the one or more processors, an output of the simulation performed by the simulation component;
train, by the one or more processors using the received output of the simulation, an intrusion detection model; and
wherein the intrusion detection model is deployed to the vehicle to predict and/or detect abnormal behaviors exhibited by the vehicle by classifying sensor outputs or network communication messages into different operating modes of the vehicle
and
notify a system of the vehicle to generate alerts to indicate a potential cyberattack.

2. The non-transitory computer-readable storage medium of claim 1, wherein the processing mode is a hardware processing mode, and the simulation component is a replica of the component of the vehicle.

3. The non-transitory computer-readable storage medium of claim 1, wherein the processing mode is a software processing mode, and the simulation component is a computer program configured to simulate operations of the component of the vehicle.

4. The non-transitory computer-readable storage medium of claim 1, wherein the signal name is an output of the simulation component.

5. The non-transitory computer-readable storage medium of claim 1, wherein receiving the operational data comprises:
receiving, by one or more processors, a request for operation data associated with a set of time; and
identifying, by the one or more processors, the operational data from a database based on the set of time, wherein the database is configured to store a plurality of operational data collected by a plurality of components of the vehicle.

6. The non-transitory computer-readable storage medium of claim 1, wherein the operational data is among a plurality of operational data collected by a plurality of components of the vehicle, the operational data is first operational data, the component is a first component, the simulation component is a first simulation component, the instruction is a first instruction, the output is a first output, and the method further comprising, prior to training the intrusion detection model:
identifying, by the one or more processors, second operational data among the plurality of operational data, wherein the second operational data is collected by a second component of the vehicle;

identifying, by the one or more processors and based on a processing mode associated with the second component, a second simulation component configured to simulate the second component of the vehicle;

transforming, by the one or more processors, the second operational data into a second instruction for the second simulation component, wherein the second instruction is in a format executable by the second simulation component to simulate the second component of the vehicle;

receiving, by the one or more processors, a second output of the simulation performed by the second simulation component; and training, by the one or more processors, the intrusion detection model using the first output and the second output.

7. The non-transitory computer-readable storage medium of claim 1, wherein a timestamp of the operational data is preserved in the output of the simulation.

8. A system comprising:
a memory device configured to store operational data collected by a component of a vehicle;
a hardware processor configured to be in communication with the memory device, the hardware processor being configured to:
retrieve the operational data from the memory device;
receive a selection indicating a processing mode to process the operational data;
identify, based on the processing mode, a simulation component configured to simulate the component of the vehicle;
search a database for a signal name relevant to a field within the operational data;
in response to a presence of the signal name in the database, generate a command line instruction using the signal name; and
in response to an absence of the signal name in the database, generate the instruction as a no-operation instruction;
transform the operational data into an instruction for the simulation component, wherein the instruction for the simulation component is in a format executable by the simulation component to simulate the component of the vehicle;
receive an output of the simulation performed by the simulation component; and
train an intrusion detection model using the received output of the simulation performed by the simulation component, wherein the hardware processor is configured to deploy the trained intrusion detection model to the vehicle to predict and/or detect abnormal behaviors exhibited by the vehicle by classifying sensor outputs or network communication messages into different operating modes of the vehicle and notifying a system of the vehicle to generate alerts for security systems or personnel to indicate a potential cyberattack.

9. The system of claim 8, wherein the processing mode is a hardware processing mode, and the simulation component is a replica of the component of the vehicle.

10. The system of claim 8, wherein the processing mode is a software processing mode, and the simulation component is a computer program configured to simulate operations of the component of the vehicle.

11. The system of claim 8, wherein the instruction is a command line instruction, and the simulation component is associated with a command line application.

12. A system comprising: a simulation environment comprising a simulation component, wherein the simulation component comprises sensors of different resistance and voltages that are stimulated by signals to generate output signals in order to simulate a component of a vehicle;
a memory device that stores operational data collected by the component of a vehicle;
a hardware processor configured to be in communication with the memory device and the simulation environment, the hardware processor being configured to:
retrieve the operational data from the memory device;
receive a selection indicating a processing mode to process the operational data;
identity, based on the processing mode, the simulation component in the simulation environment, wherein the simulation component is configured to simulate the component of the vehicle;
transform the operational data into an instruction for the simulation component, wherein the instruction is in a format executable by the simulation component to simulate the component of the vehicle, wherein receiving the operational data comprises:
receiving, by one or more processors, a request for operation data associated with a set of time; and
identifying, by the one or more processors, the operational data from a database based on the set of time, wherein the database is configured to store a plurality of operational data collected by a plurality of components of the vehicle; and
send the instruction to the simulation environment;
wherein the simulation component of the simulation environment is configured to:
execute the instruction to generate an output; and
send the output to the hardware processor;
wherein the hardware processor is further configured to train an intrusion detection model using the output, and the intrusion detection model is being trained to detect abnormal behavior exhibited by the vehicle by deploying the intrusion detection model to the vehicle, wherein the intrusion detection model classifies sensor outputs or network communication messages into different operating modes of the vehicle and notifying a system of the vehicle to generate alerts for security systems or personnel to indicate a potential cyberattack.

13. The system of claim 12, wherein the instruction is a command line instruction, and the simulation environment is a command line application.

14. A non-transitory computer-readable storage medium having instructions encoded thereon for a computer program product of training data generation, the computer program being arranged such that, when executed by one or more processors, cause the one or more processors to:
receive operational data of a vehicle, wherein the operational data is collected by a component of the vehicle, wherein receiving the operational data comprises:
receiving, by one or more processors, a request for operation data associated with a set of time; and
identifying, by the one or more processors, the operational data from a database based on the set of time, wherein the database is configured to store a plurality of operational data collected by a plurality of components of the vehicle;
receive a selection indicating a processing mode to process the operational data;
identify, based on the processing mode, a simulation component, wherein the simulation component comprises a computer program that simulates programs that are run by a system of a vehicle to simulate the component of the vehicle; transform the operational data into an instruction for the simulation component, wherein the instruction is in a format executable by the simulation component to simulate the component of the vehicle, wherein transforming the operational data into the instruction comprises:

searching, by the one or more processors, a database for a signal name relevant to a field within the operational data;

in response to a presence of the signal name in the database, generating a command line instruction using the signal name; and in response to an absence of the signal name in the database, generating the command line instruction as a no-operation instruction;

receive an output of the simulation performed by the simulation component; and train, by the one or more processors, an intrusion detection model, using the received output of the simulation performed by the simulation component, that is deployed to the vehicle by the one or more processors to predict and/or detect abnormal behaviors exhibited by the vehicle by classifying sensor outputs or network communication messages into different operating modes of the vehicle and notifying a system of the vehicle to generate alerts for security systems or personnel to indicate a potential cyberattack.

15. The non-transitory computer-readable storage medium of claim 14, wherein the instruction is a command line instruction, and the simulation component is associated with a command line application.

* * * * *